(12) United States Patent
Nierhaus et al.

(10) Patent No.: US 7,428,223 B2
(45) Date of Patent: Sep. 23, 2008

(54) METHOD FOR BACKGROUND NOISE REDUCTION AND PERFORMANCE IMPROVEMENT IN VOICE CONFERENCING OVER PACKETIZED NETWORKS

(75) Inventors: Florian Patrick Nierhaus, Sunnyvale, CA (US); Philippe Vandermersch, San Jose, CA (US)

(73) Assignee: Siemens Corporation, Iselin, NJ (US)

( * ) Notice: Subject to any disclaimer, the term of this patent is extended or adjusted under 35 U.S.C. 154(b) by 950 days.

(21) Appl. No.: 09/965,375

(22) Filed: Sep. 26, 2001

(65) Prior Publication Data

US 2003/0063572 A1    Apr. 3, 2003

(51) Int. Cl.
*H04L 12/16* (2006.01)
*H04Q 11/00* (2006.01)
*H04M 3/42* (2006.01)

(52) U.S. Cl. .................. 370/260; 370/263; 370/267; 379/202.01

(58) Field of Classification Search ......... 370/260–267, 370/270–271, 338–390, 395–401, 432–521; 709/224–235; 379/202–212; 704/216–226
See application file for complete search history.

(56) References Cited

U.S. PATENT DOCUMENTS

| | | | | |
|---|---|---|---|---|
| 4,416,007 | A * | 11/1983 | Huizinga et al. | 370/267 |
| 4,797,876 | A * | 1/1989 | Ratcliff | 370/261 |
| 5,384,772 | A * | 1/1995 | Marshall | 370/235 |
| 5,436,896 | A * | 7/1995 | Anderson et al. | 370/260 |
| 5,530,699 | A * | 6/1996 | Kline | 370/260 |
| 5,898,676 | A * | 4/1999 | Apfelbeck et al. | 370/260 |
| 5,963,547 | A * | 10/1999 | O'Neil et al. | 370/260 |
| 5,963,662 | A * | 10/1999 | Vachtsevanos et al. | 382/150 |
| 5,983,192 | A * | 11/1999 | Botzko et al. | 704/500 |
| 5,991,277 | A | 11/1999 | Maeng et al. | |
| 6,178,237 | B1 * | 1/2001 | Horn | 379/202.01 |
| 6,262,979 | B1 * | 7/2001 | Anderson et al. | 370/267 |
| 6,404,873 | B1 * | 6/2002 | Beyda et al. | 379/202.01 |
| 6,463,414 | B1 * | 10/2002 | Su et al. | 704/270.1 |
| 6,662,211 | B1 * | 12/2003 | Weller | 709/204 |
| 6,687,752 | B1 * | 2/2004 | Falco et al. | 709/230 |
| 6,697,614 | B2 * | 2/2004 | Dorenbosch | 455/416 |
| 6,731,609 | B1 * | 5/2004 | Hirni et al. | 370/260 |
| 6,792,092 | B1 * | 9/2004 | Michalewicz | 370/263 |
| 6,940,826 | B1 * | 9/2005 | Simard et al. | 370/260 |
| 6,956,828 | B2 * | 10/2005 | Simard et al. | 370/260 |
| 6,999,920 | B1 * | 2/2006 | Matt et al. | 704/215 |
| 7,006,455 | B1 * | 2/2006 | Fandrianto et al. | 370/260 |
| 7,006,456 | B2 * | 2/2006 | Rabipour et al. | 370/260 |
| 7,006,616 | B1 * | 2/2006 | Christofferson et al. | 379/202.01 |
| 2002/0105917 | A1 * | 8/2002 | Rabipour et al. | 370/260 |

(Continued)

FOREIGN PATENT DOCUMENTS

EP    1039734 A2    9/2000

(Continued)

*Primary Examiner*—M. Phan (57) ABSTRACT

The present invention is directed to a system and method for background noise reduction and performance improvement in conferencing. A method for providing a conferencing session may include receiving inputs from a number of participants in a conferencing session. A number of prominent inputs are determined from the received inputs and the determined prominent inputs are combined into a first output stream. The output stream is suitable for being sent to at least one participant of the number of participants in the conferencing session.

15 Claims, 6 Drawing Sheets

U.S. PATENT DOCUMENTS

| | | | |
|---|---|---|---|
| 2002/0118650 A1* | 8/2002 | Jagadeesan et al. | 370/260 |
| 2002/0167915 A1* | 11/2002 | Mills et al. | 370/260 |
| 2003/0002448 A1* | 1/2003 | Laursen et al. | 370/261 |
| 2003/0012148 A1* | 1/2003 | Peters | 370/260 |
| 2003/0063573 A1* | 4/2003 | Vandermersch | 370/260 |
| 2004/0076271 A1* | 4/2004 | Koistinen et al. | 379/88.11 |
| 2004/0101120 A1* | 5/2004 | O'Malley et al. | 379/202.01 |
| 2005/0185602 A1* | 8/2005 | Simard et al. | 370/260 |

FOREIGN PATENT DOCUMENTS

WO     WO 00/72560 A1     11/2000

* cited by examiner

METHOD FOR BACKGROUND NOISE REDUCTION AND PERFORMANCE IMPROVEMENT IN VOICE CONFERENCING OVER PACKETIZED NETWORKS

BACKGROUND OF THE INVENTION

1. Field of the Invention

The present invention relates generally to data transfer and particularly to a method for background noise reduction and performance improvement in voice conferencing over packetized networks.

2. Description of the Related Art

Conference calling, such as a conference by telephone and other like audio and/or visual device in which three or more persons in different locations participate by means of a central switching unit, enables participants in widely dispersed geographical areas to communicate in an efficient manner in real time. Because of the great utility provided by conference calls, the use of this method of communication has made its way into many aspects of modern life, connecting home users, wireless users, business personnel, and the like, to enable multiple users the ability to communicate with each other at the same time. In this way, a group of people may communicate directly without requiring the participants to physically travel to the same location. However, a conference call may encounter a large quantity of background noise thereby reducing the quality and utility of the conference call.

Therefore, when mixing voice streams from multiple participants in a conference call, it is desirable to reduce background noise within the conference call as well as reduce computational resource requirements required in providing the call. Previous methods utilized to correct for background noise involved outputting to each participant the gain corrected sum of all voices, outputting to each participant the gain corrected sum of the voices of all other participants and outputting only the loudest speaker to each participant.

While outputting to each participant the gain corrected sum of all voices may be acceptable in circuit switched networks, in which delays are low and participants can not hear their own voice due to compensation by the human communication channel and brain of the participant, such a method is not feasible in a packetized network. For instance, in an environment where voice is transported over a packet network, the delay may be larger, so that participants may be able to hear their own voice, recognized as a disturbing echo. Such an echo is typically too strong to be removed utilizing normal echo cancellation, and further, requires extensive resources, as such removal may be computationally expensive as the echo tail may be quite long, such as greater than 60–160 ms.

Outputting to each participant the gain corrected sum of the voices of all other participants adds in addition to the voice of active participants background noise for "silent" participants. Thus, as the number of participants increase, the background noise from "silent" participants also increases, thereby lowering the quality of the communication. Additionally, this technique is computationally expensive, since it may be necessary to perform a time add of (n−1) voices for each participant, n being the number of participants.

Further, outputting only the loudest speaker to each participant generally suffers from insufficient voice quality. For example, in conference calls with high interactivity, switchovers between participants may be disturbing to the participants. During a switchover between loudest participants, information from one participant may be lost, thereby affecting the continuity of the call and the overall experience. Moreover, situations may be encountered within the call in which more than one speaker may wish to speak at the same time. In such a situation, one of the inputs would not be provided to the other participants, and the originating participant may not even know if the output was transmitted.

SUMMARY OF THE INVENTION

Accordingly, the present invention is directed to a method for background noise reduction and performance improvement in conferencing. The present invention provides improvement of sound quality by reducing background noise, and further results in a reduction of computation resource requirements. By reducing background noise in conference calls, conference calls are possible with a large number of participants without resulting in degradation of quality and a significant reduction in computation resources. Additionally, the present invention may ensure that participants do not receive a stream including the participant's own output, such as the participant's own voice, so as to avoid an occurrence of an echo due to a delay encountered in a packetized network.

In a first aspect of the present invention, a method for providing a conferencing session includes receiving inputs from a number of participants in a conferencing session. A number of prominent inputs are determined from the received inputs and the determined prominent inputs are combined into a first output stream. The output streams are suitable for being sent to at least one participant of the number of participants in the conferencing session.

In a second aspect of the present invention, a method for providing a conferencing session includes receiving inputs from a number of participants in a conferencing session. The received inputs are combined into an output stream for an originating participant of an input of the received inputs, the output stream not including the originating participant's input.

In a third aspect of the present invention, a conferencing system suitable for providing a conferencing session to a plurality of participants includes a multipoint control unit communicatively coupled over a packetized connection to a plurality of input/output devices to enable the participants of a conferencing session to interact. The multipoint control unit is configured to receive inputs from the participants in the conferencing session, determine a number of prominent inputs from the received inputs and combine the determined prominent inputs into a first output stream suitable for being sent to at least one participant of the conferencing session.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Referring generally now to FIGS. 1 through 6, exemplary embodiments of the present invention are shown. The present invention provides a comprehensive solution for voice media mixing in conferences over packetized networks. When mixing voice streams from multiple participants in a conference call, it is desirable to reduce background noise within the conference call as well as reduce computational resource requirements required in providing the call. Previous methods utilized to correct for background noise involved outputting to each participant the gain corrected sum of all voices, outputting to each participant the gain corrected sum of the voices of all other participants and outputting only the loudest speaker to each participant. However, these methods were inefficient, resource intensive, and may result in perceived echoes. By utilizing the present invention, background noise is reduced, conference calls with greater numbers of participants are enabled, and echoes are eliminated.

Figure 1:
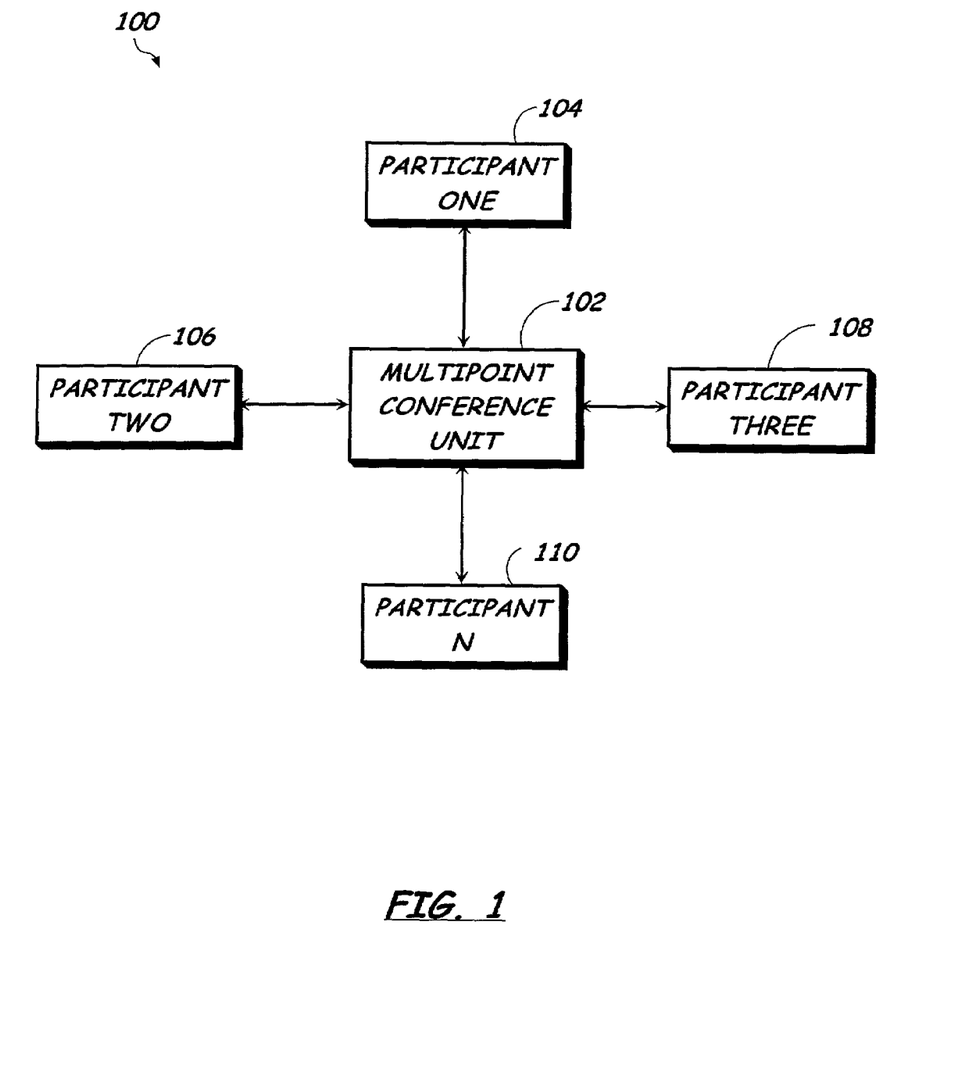
FIG. 1 is a block diagram depicting an embodiment of the present invention wherein a conference call system as utilized by a number of participants is shown.

Referring now to FIG. 1, an embodiment 100 of the present invention is shown wherein a conference call system as utilized by a number of participants is shown. A conference call system, which may be implemented as a multipoint control unit 102 (MCU) in an IP system, enables a plurality of participants to communicate in real time. Each participant may communicate over an input/output device communicatively coupled to the multipoint conference unit so as to enable the participants to interact over a conferencing session. For instance, participant one 104, participant two 106, participant three 108 and up to participant N 110, located in different geographical regions, may participate by means of the multipoint conference unit 102.

During a conference calling session, background noise may be encountered from "silent" participants in which noise from participants surroundings is received and transferred by the system, even if the participant is not communicating. This problem is magnified with each additional participant. However, by choosing a desired number of prominent inputs, such as the loudest input, clearest input, and the like, and providing those inputs to the participants, background noise and computational requirements may be reduced. Inputs may include voice packets utilized in a packeted data transfer system, such as a voice packet including voice recorded for a short period of time, e.g. 125 µs to 4 ms, PCM, and the like as contemplated by a person of ordinary skill in the art.

For instance, input streams received as packets may be reconstructed inside the multipoint conference unit 102 to arrive at a continuous flow of voice. The prominent inputs may then be determined dynamically within a period of time, such as a few milliseconds. The output streams are the results of a combination of the prominent inputs, which may then be repacketized to be sent out on the network.

Figure 2:
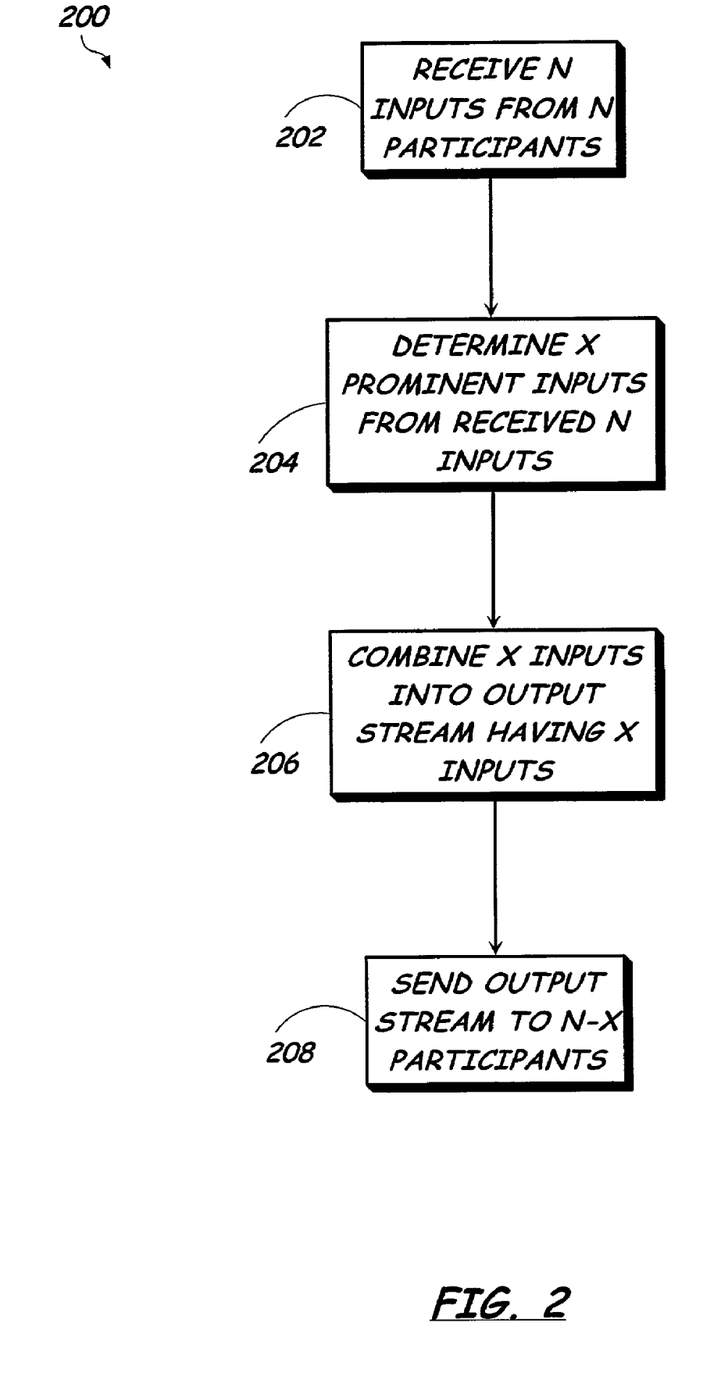
FIG. 2 is a flow diagram illustrating an exemplary method of the present invention wherein determined prominent inputs are combined and provided to participants in a conference call.

Referring now to FIG. 2, an exemplary method 200 of the present invention is shown wherein determined prominent inputs are combined and provided to participants in a conference call. Input streams, described as "N" inputs signifying the number of participants in a conference, are received 202. A number of prominent inputs are then determined from the received "N" inputs, which may include a number "X" representing a desired number of prominent inputs to be identified 204. Inputs may be classified as prominent based on loudness of input, such as signal strength, clarity of voice in the signal, clarity of signal overall, and the like as contemplated by a person of ordinary skill in the art.

The "X" inputs are then combined into an output stream 206. The output stream is then sent to the participants, and preferable only to the participants which did not originate the "X" inputs, such as the "N–X" participants 208. In this way, the output streams are provided to participants that will not encounter an echo upon receiving the stream. Additionally, an output stream will be provided to the X participants to receive output of other participants in the conference call.

Figure 3:
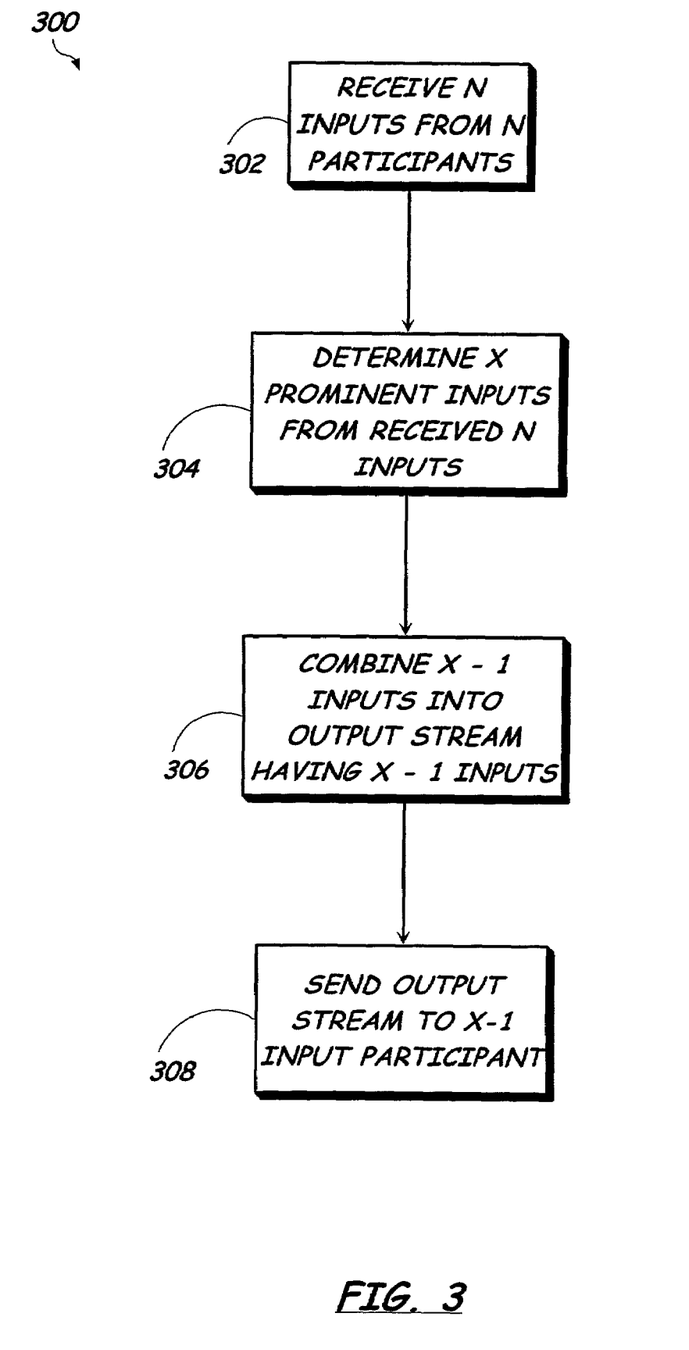
FIG. 3 is a flow diagram depicting an exemplary method of the present invention wherein determined prominent inputs are combined to provide an output stream without providing an echo and with reduced background noise.

For example, referring now to FIG. 3, an exemplary method 300 of the present invention is shown wherein determined prominent input streams are combined to provide an output stream without providing an echo and with reduced background noise. Input streams, such as "N" inputs described in FIG. 2, are received 302. Prominent inputs, "X," are then determined from the received "N" inputs 304.

For originating participants of the "X" inputs, an output stream is obtained by combining the other "X" inputs 306, in other words, the "X–1" inputs. The output stream having the "X–1" inputs is then sent to the "X" participant 308. Thus, a participant originating a prominent input receives an output stream including the other prominent outputs, thereby eliminating a possible echo effect due to packet transfer delay over a packetized system. The process may be performed for each "X" participant originating a prominent output so that a comprehensive conference experience is provided for each participant.

Figure 4:
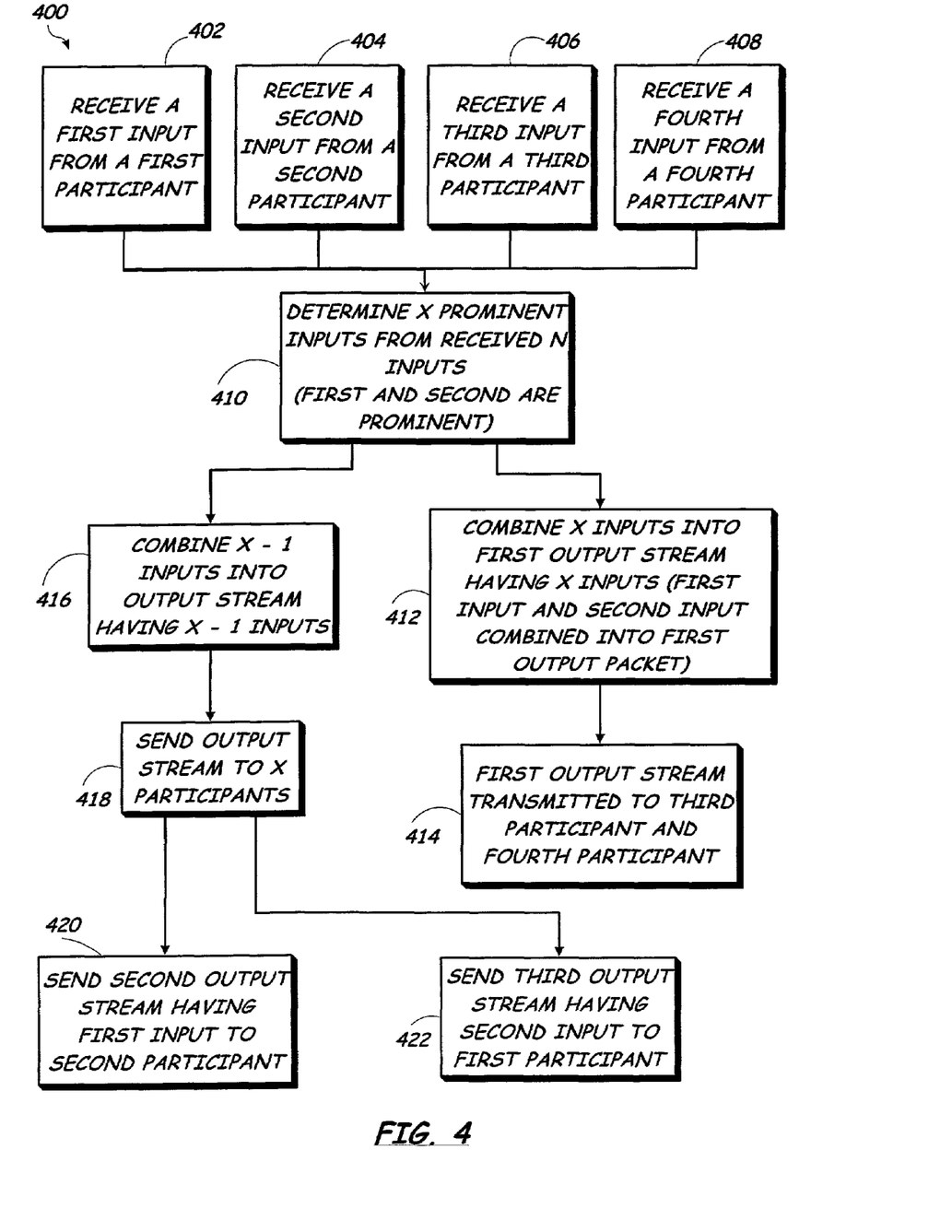
FIG. 4 is a flow diagram of an exemplary method of the present invention wherein a conferencing session involving a plurality of participants is provided with reduced background noise and computational requirements.

Referring now to FIG. 4, an exemplary embodiment 400 of the present invention is shown wherein a conferencing session involving a plurality of participants is provided with reduced background noise and computational requirements. Four participants are engaged in a conferencing session. A first input stream is received from a first participant 402, a second input stream is received from a second participant 404, a third input stream is received from a third participant 406 and a fourth input stream is received from a fourth participant 408. "X" prominent inputs, in this instance "X" being pre-selected as two, are then determined from the received inputs 410, the two "X" inputs from the first participant and the second participant.

The "X" inputs are combined into a first output stream, in this instance; the first input and second input stream are combined into a first output stream 412. The first output stream is then transmitted to the third participant and the fourth participant 414. Thus, a single output stream may be utilized for all participants that did not originate a prominent input, thereby resulting in an efficient use of computational resources. In this way, an improved conferencing session is achieved, by enabling larger groups of participants to be involved in a conferencing session without decreasing the quality of the conferencing session.

For participants originating the determined prominent inputs, output streams are formed for each originating participant which do not include the participant's input, i.e. "X−1" output stream 416, and set to the respective "X" participants 418. For example, a second output stream is formed having the second input and sent to the first participant 420. Likewise, a third output stream is formed having the second input and is sent to the first participant 422. In this way, each participant of the conferencing session receives data without encountering an echo, with reduced background noise and with efficient use of computational resources.

The output streams provided to each of the participants in the present embodiment are summarized in the following table. As the first participant and the second participant originated the prominent inputs, the first participant receives an output stream having input from the second participant, and likewise, the second participant receives an output stream having an input from the first participant. The Third and Fourth Participants receive an output stream having the prominent inputs from both the First Participant and the Second Participant.

|  | Output to First Participant | Output to Second Participant | Output to Third Participant | Output to Fourth Participant |
| --- | --- | --- | --- | --- |
| Input One |  | X | X | X |
| Input Two | X |  | X | X |
| Input Three |  |  |  |  |
| Input Four |  |  |  |  |

Although two prominent inputs, "X," were described as a pre-selected number of input in the previous example, a wide range of prominent inputs are contemplated by the present invention without departing from the spirit and scope thereof. For example, as shown in the following table, three prominent inputs, "X," may be selected to provide a conferencing session in accordance with the present invention. The determined prominent inputs are A, B and C, with N representing additional participants in the conferencing session. Thus, in a voice conferencing session, each participant would hear the following inputs. As described above, participants originating prominent inputs receive output streams from the system that do not include their respective inputs. For instance, participant A receives an output stream resulting of the mixing of the input streams from participants B and C, participant B receives an output stream resulting of the mixing of the input streams from participants A and C, and likewise, participant C receives an output stream resulting of the mixing of the input streams from participants A and B. For the "N" participants, an output stream resulting of the mixing of the prominent inputs A, B and C is provided.

|  | Output to A | Output to B | Output to C | Output to N |
| --- | --- | --- | --- | --- |
| Input A |  | X | X | X |
| Input B | X |  | X | X |
| Input C | X | X |  | X |
| Input N |  |  |  |  |

Additionally, the output streams provided to each participant may be dynamically determined. For example, referring now to FIG. 5, an exemplary method 500 of the present invention is shown wherein a number of inputs included in an output stream, provided to participants originating prominent inputs, includes a next prominent input. "N" inputs are received from "N" participants 502 and "X" prominent inputs are determined from the received inputs 504. For participants that did not originate a prominent input 506, the "X" inputs are combined into an output stream 508 and sent to the "N−X" participants 510.

Figure 5:
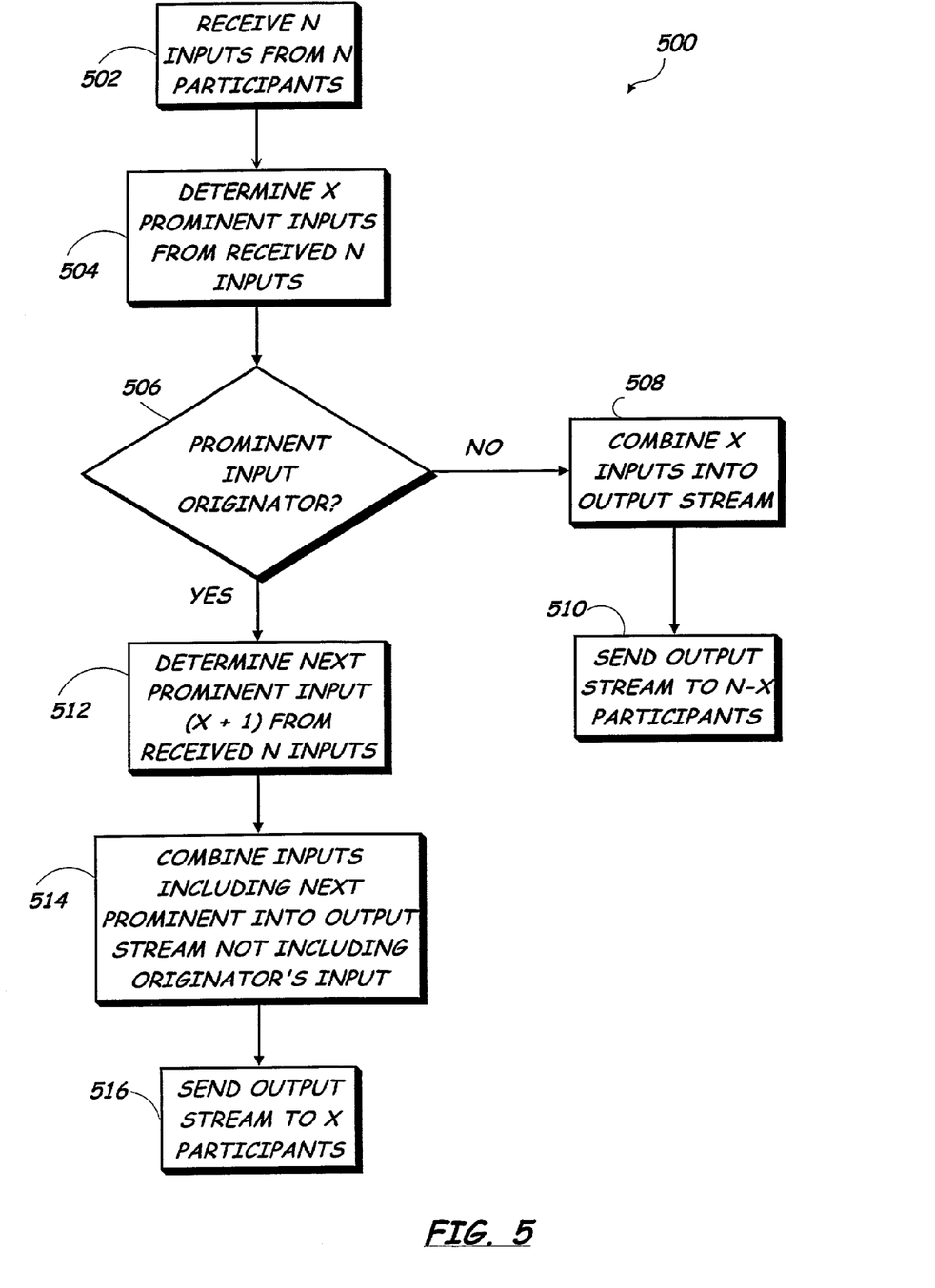
FIG. 5 is a flow diagram illustrating an exemplary method of the present invention wherein a number of inputs included in an output stream provided to participants originating prominent inputs includes a next prominent input.

For participants that did originate a prominent input 506, a next prominent input, i.e. "X+1," input is determined from the received N inputs 512. For instance, a next prominent input may include the next loudest input, next clearest input, and the like as contemplated by a person of ordinary skill in the art. Further, the prominent characteristic may be different from the characteristic utilized to determine the initial "X" prominent inputs without departing from the spirit and scope of the present invention. For example, the "X" prominent inputs may be determined by signal clarity, and the next most prominent input may be determined by strength of signal.

The next most prominent input is then combined with other prominent inputs into an output stream, which does not include the respective originator's input. Output streams configured for each prominent-input-originating participant are the sent to the "X" participants 516. Thus, participants of a conference call that originate a prominent input may receive an increased number of inputs from other participants in the conferencing session.

The following table further describes the embodiment described in relation to FIG. 5. Three prominent inputs, "X," are initially selected to provide a conferencing session in accordance with the present invention. The determined prominent inputs are A, B and C, with D and N representing additional participants in the conferencing session. As described above, participants originating prominent inputs receive output streams from the system that do not include their respective inputs. Further, originating participants receive the next most prominent input. For instance, participant A receives an output stream including input streams from participants B, C and D, participant B receives an output stream including input streams from participants A, C and D, and likewise, participant C receives an output stream including input streams from participants A, B and D. For "N" participants and "D" participant, an output stream including the prominent inputs A, B and C is provided.

|  | Output to A | Output to B | Output to C | Output to N & D |
| --- | --- | --- | --- | --- |
| Input A |  | X | X | X |
| Input B | X |  | X | X |
| Input C | X | X |  | X |
| Input D | X | X | X |  |
| Input N |  |  |  |  |

Figure 6:
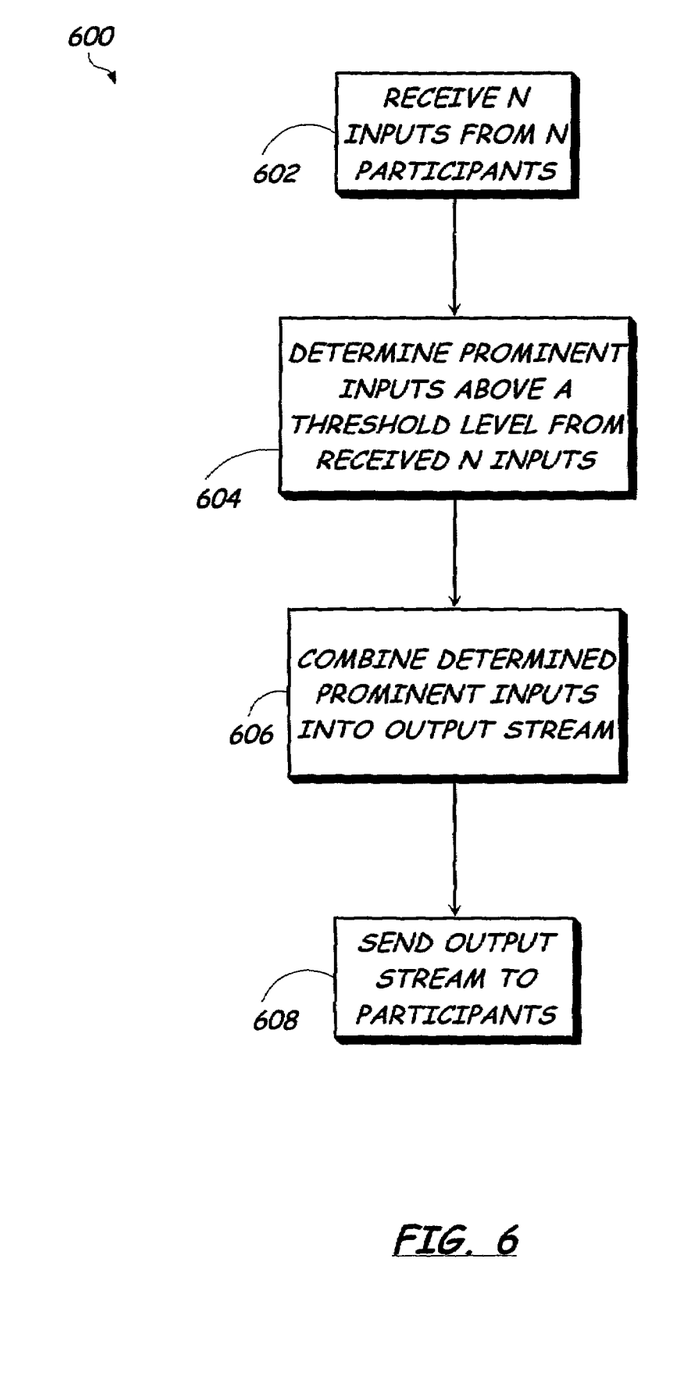
FIG. 6 is a flow diagram depicting an exemplary method of the present invention wherein a number of prominent inputs is determined based upon a threshold level of a desired characteristic.

Referring now to FIG. 6, an exemplary method 600 of the present invention is shown wherein a number of prominent inputs is determined based upon a threshold level. In some instances, it may be desirable to determine if an input is above a threshold level before combining the input into an output stream. For instance, in an "X" determined number of prominent inputs, one of the "X" inputs may be below a volume level indicating that the input is merely background noise, may lack sufficient clarity, and the like. Combining such an input lacking the desired characteristic may result in degradation of the quality of the conferencing session. However, by utilizing the present method, such an input would not be combined, and therefore, would not degrade the conferencing session.

For example, "N" inputs may be received from "N" participants in a conferencing session 602. Prominent inputs are determined from inputs above a threshold characteristic level from the "N" inputs 604. For example, although "X" may be three, only two of the three most prominent inputs correspond to a desired characteristic threshold, such as loudness, signal clarity, and the like. The determined prominent inputs having the desired characteristics are then combined into an output stream 606, and the output stream is sent to participants 608. It should be apparent that this method may be combined with any of the previous methods described so that a number of inputs, dynamically determined based upon a number above a desired threshold characteristic, are combined to provide an improved conferencing session without departing from the spirit and scope of the present invention.

Although the invention has been described with a certain degree of particularity, it should be recognized that elements thereof may be altered by persons skilled in the art without departing from the scope and spirit of the invention. It is understood that the specific orders or hierarchies of steps in the methods illustrated are examples of exemplary approaches. Based upon design preferences, it is understood that the specific orders or hierarchies of these methods can be rearranged while remaining within the scope of the present invention. The accompanying method claims present elements of the various steps of methods in a sample order, and are not meant to be limited to the specific order or hierarchy presented.

It is believed that the scope of the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for providing a conferencing session over a packetized network, comprising:
   receiving inputs from a number of participants in the conferencing session over the packetized network;
   determining a number of prominent inputs from the received inputs;
   combining the determined prominent inputs into a first output stream suitable for being sent to at least one participant of the number of participants in the conferencing session; and
   combining determined prominent inputs into a second output stream for an originating participant of prominent input of the determined number of prominent inputs, the second output stream not including the originating participant's input, wherein the second output stream includes a next most prominent received input, the next most prominent received input being determined by a characteristic different than the characteristic utilized to determine the number of prominent inputs from the received inputs.

2. The method as described in claim 1, wherein inputs are determined as prominent based upon a characteristic including at least one of loudness, signal strength, clarity and prominence history.

3. The method as described in claim 1, further comprising sending the first output stream to participants which did not originate a prominent output and sending the second output stream to the participant originating the prominent input not included in the second output stream.

4. The method as described in claim 1, wherein the number of prominent inputs to be determined is pre-selected.

5. The method as described in claim 1, wherein determining the prominent inputs includes determining if an input corresponds to a desired characteristic threshold.

6. The method as described in claim 1, wherein the conferencing session is utilized over a packetized system so that at least one of the received inputs and output stream are configured as packets.

7. A method for providing a conferencing session over a packetized network, comprising:
   receiving inputs from a number of participants in the conferencing session over the packetized network;
   determining a number of prominent inputs from the received inputs, the inputs being determined as prominent based upon a characteristic including at least one of loudness, signal strength, clarity, and prominence history; and
   combining received inputs into an output stream for an originating participant of an input of the received inputs, the output stream not including the originating participant's input and including a next most prominent received input, wherein the next most prominent received input is determined by a characteristic different than the characteristic utilized to determine the number of prominent inputs from the received inputs.

8. The method as described in claim 7, wherein the number of prominent inputs to be determined is pre-selected.

9. The method as described in claim 7, wherein determining the prominent inputs includes determining if an input corresponds to a desired characteristic threshold.

10. The method as described in claim 7, wherein the conferencing session is utilized over a packetized system so that at least one of the received inputs and outputs are configured as packetized streams.

11. A conferencing system suitable for providing a conferencing session to a plurality of participants, comprising:
    a multipoint conferencing unit communicatively coupled over a packetized connection to a plurality of input/output devices so as to enable the participants of the conferencing session to interact, wherein the multipoint conferencing unit is configured to
    receive inputs from the participants in the conferencing session;
    determine a number of prominent inputs from the received inputs;
    combine the determined prominent inputs into a first output stream suitable for being sent to at least one participant of the conferencing session; and
    combine the determined prominent inputs into a second output stream for an originating participant of a prominent input of the determined number of prominent inputs, the second output stream not including the originating participant's input, wherein the second output stream includes a next prominent received input, the next prominent received input being determined by a characteristic different than the characteristic utilized to determine the number of prominent inputs from the received inputs.

12. The conferencing system as described in claim 11, wherein inputs are determined as prominent based upon a characteristic including at least one of loudness, signal strength, clarity and prominence history.

13. The conferencing system as described in claim 11, wherein the first output stream is sent to participants which did not originate a prominent output and the second output stream is sent to the participant originating the prominent input not included in the second output stream.

14. The conferencing system as described in claim 11, wherein the number of prominent inputs to be determined is pre-selected.

15. The conferencing system as described in claim 11, wherein determining the prominent inputs includes determining if an input corresponds to a desired characteristic threshold.

* * * * *

UNITED STATES PATENT AND TRADEMARK OFFICE
CERTIFICATE OF CORRECTION

| | | |
|---|---|---|
| PATENT NO. | : 7,428,223 B2 | Page 1 of 1 |
| APPLICATION NO. | : 09/965375 | |
| DATED | : September 23, 2008 | |
| INVENTOR(S) | : Nierhaus et al. | |

It is certified that error appears in the above-identified patent and that said Letters Patent is hereby corrected as shown below:

Title Page should read (73) Assignee: Siemens Communications, Inc., Boca Raton, FL (US)

Signed and Sealed this
Twenty-ninth Day of March, 2011

David J. Kappos
*Director of the United States Patent and Trademark Office*